United States Patent [19]

Bidner et al.

[11] Patent Number: 4,786,919

[45] Date of Patent: Nov. 22, 1988

[54] METHOD AND APPARATUS FOR PLACING INFORMATION ON A MEDIUM WHILE COMPENSATING FOR DEVIATIONS FROM A CHARACTERISTIC TIME PERIOD

[75] Inventors: Harvey Bidner, Plainview; James J. Zuber, Mastic, both of N.Y.

[73] Assignee: Bidco Inc., Hicksville, N.Y.

[21] Appl. No.: 891,535

[22] Filed: Jul. 29, 1986

[51] Int. Cl.⁴ .............................................. G01A 9/42
[52] U.S. Cl. .................................... 346/108; 358/296
[58] Field of Search ............... 346/108, 11.1, 107 R, 346/76 L, 160; 358/296, 300, 302, 285, 293

[56] References Cited

U.S. PATENT DOCUMENTS

3,848,087 11/1974 Carrell ................................. 346/108
4,204,233 5/1980 Swager ................................ 346/108
4,350,988 9/1982 Masegi ................................ 346/108

*Primary Examiner*—E. A. Goldberg
*Assistant Examiner*—Mark Reinhart
*Attorney, Agent, or Firm*—Roberts, Spiecens & Cohen

[57] ABSTRACT

A laser scanning apparatus is provided with a compensating arrangement whereby deviations of a synchronous drive are compensated for by adjusting the frequency with which the laser beam is modulated. The laser beam is directed onto a rotatable spinner which causes the laser beam to scan a synchronized moving medium in a number of sequential and parallel lines, each of which is determined during a cycle of the movement of the spinner. The spinner is driven by a synchronous motor. During each cycle, a period error is measured to determine a compensating signal which is held for the next successive cycle and is used to control the frequency of a variable oscillator which determines the clocking rate at which information is employed to modulate the laser beam. According to the method of the invention, lines of information are placed on a synchronized moving medium responsive to the aforesaid laser beam during successive cycles. The method involves modulating the laser beam in accordance with the information and at a frequency which is modified for each cycle in accordance with the deviation of the preceding cycle with respect to a characteristic normal time period.

10 Claims, 3 Drawing Sheets

METHOD AND APPARATUS FOR PLACING INFORMATION ON A MEDIUM WHILE COMPENSATING FOR DEVIATIONS FROM A CHARACTERISTIC TIME PERIOD

FIELD OF INVENTION

This invention relates to the use of laser beams or the like for depositing information on media in processes such as may be involved in the graphic arts. The invention also relates to methods and apparatus for compensating for deviations from normal time periods or cycles which determine the organization of successive lines of information which are deposited on a medium as for example in the nature of a raster.

BACKGROUND OF INVENTION

Spinner angular velocity errors in laser printers have previously been minimized by two very expensive and complex techniques.

One of these techniques is the use of a frictionless, air bearing suspension system for a phase lock servo controlled spinner. This is the most expensive and complex technique.

Another technique uses an output data clock for scan line data stored in an electronic memory. The output data clock may be generated by splitting the energy from the main recording laser beam so that a portion of the energy impinges on a precisely ruled high resolution grating. The energy passed by the high resolution grating is then sensed by an optical detector so as to obtain the information needed to make the correction in the motor speed. This is, in turn, corrects the rate with which the data is generated. An optical encoder coupled to the spinner facet assembly will also generate an output data clock.

In both output data clock cases, a multiplying phase lock loop is required to multiply the grating or encoder output frequency up to the output data clock frequency. In addition, the grating requires auxiliary beam optics and an auxiliary beam detector which results in a more complex optical design. The optical encoder also requires a more complex spinner assembly in addition to encoder output electronics. Since all of the laser printer designs discussed above require much additional auxiliary equipment, they are more complex and more expensive than the present invention, which utilizes only the start-of-line signal generator which is required by all laser printer designs.

More particularly, reference is made to U.S. Pat. No. 4,067,021 which issued to Howard Baylis et al. on Jan. 3, 1978 and which relates to an optical scanning apparatus comprising a source of light with which is employed a rotatable reflecting element having a plurality of reflective facets. In this apparatus, each facet of a multi-facet arrangement causes a focused beam to scan across the surface of a medium with a drive being provided for moving the recording medium perpendicular to the direction of scanning.

In this apparatus are employed an incremental type optical encoder direct coupled to the facet assembly and to the spinner drive motor and a frequency multiplying phase lock loop. This provides the output data clocking frequency for laser beam modulation. A start-of-line photocell senses the laser beam before each scan and gates the laser beam modulation clock on, thus removing facet-to-facet errors. This arrangement differs from that of the present invention for the reasons given above and as will be seen in greater detail hereinbelow.

Attention is further directed particularly to U.S. Pat. No. 4,257,053 granted to Cecil Gilbreath on Mar. 17, 1981. In this patent is disclosed a high-resolution laser graphics plotter for plotting data on a recording medium as selectively positioned spots or pixels of variable intensity. The intensity of a laser beam is modulated to produce a spot on a light-sensitive film. A multi-facet rotating mirror enables the modulated beam to scan across an image plane. This arrangement employs a flat field scan lens positioned between the rotating mirror and the image plane to provide correction for the non-linear velocity of the beam as it is scanned across the image plane.

This arrangement employs an optical encoder direct coupled to the DC motor and facet assembly and a frequency multiplying phase lock loop. This provides the output data clocking frequency for laser beam modulation. The optical encoder produces 48,000 cycles per revolution (8000 cycles for each of six scanning facets). The phase lock loop multiplying factor is 96, which results in 768,000 cycles for each of the six scanning facets. Logic circuits, which sense angular position, are used to correct facet-to-facet and facet-to-axis errors.

A micro-stepping motor assembly is provided to advance the film across the image plane. As will be seen hereinbelow, the present invention provides improvements and features which are not to be found in this patent.

SUMMARY OF INVENTION

The compensation technique of the present invention locks the print output data clock frequency (laser beam modulation frequency) of an existing scan line to the previous cycle's angular velocity. This maintains the number of pixels with equal spacing.

A hysteresis synchronous motor is used to drive directly a rotating mirror which in one embodiment is a single facet arrangement. Synchronous motor hunt (i.e., vary slowly) about the exact synchronous center frequency. These small, slowly varying changes are compensated for by varying the output print data clock frequency (the rate at which the pixels are generated) for the current scan line in direct proportion to the rate at which the pixels were generated in the previous scan line. This rapid correction is possible because it is made electronically. This scheme takes advantage of the relatively rapid response time of the electronically-controlled print clock oscillator as compared with the relative slow response time of a spinner motor and its feedback, speed-correcting mechanism.

The advantage of correcting by a rapid electronic means, rather than by correcting the speed of the spinner motor can be seen from the following. Each spinner motor and its associated load has a series of mechanical resonances, which typically begin at frequencies of about 400 Hz. These mechanical resonances result in large variations in gain and phase shift at frequencies near or at these mechanical resonances. Moreover, the precise frequencies of these mechanical resonances vary from one spinner motor to another, and depend on minute differences in the manufacturing process as well as on slightly different masses and spring constants within each motor and associated load. Because of this, the design and frequency compensation of the electronic feedback loop necessary to stabilize the spinner motor feedback system will vary from one spinner motor and associated load to another. Because of these resonances, it is necessary to limit the bandwidth for the conventional feedback system (used to correct the motor speed) to that portion of the frequency spectrum that does not contain the resonances of the motor. Therefore, the bandwidth should be confined to about 400 Hz.

However, limiting the bandwidth of the speed-correcting feedback system to 400 Hz, implies that the time of response for the speed-correcting servo system is about 15.7 milliseconds. (about $2 \times pi \times$ the reciprocal of the bandwidth.)

The system uses a motor that rotates rapidly so as to generate data as quickly as possible. (In the system under discussion, the spinner motor rotates at 281.7 revolutions per second.) The time for one revolution is therefore 3.55 milli-seconds. Thus, using a conventional servo loop to correct the motor speed implies that, in the time required to make this correction (about 15.7 milli-seconds), several lines of data will be mis-aligned.

Each rotation cycle of the single facet scanner is timed for the error from the center value of its period time between two successive start-of-line signals. The period time error of the previous cycle is used to increase (or decrease) proportionally the print data output clock frequency for the present scan line when the motor angular velocity increased or (decreased) during the previous cycle.

The rotational frequency of the synchronous motor is very high compared to the hunting frequency of the synchronous motor. It is, for example, approximately 80 to 1 in one embodiment. The spinner angular velocity is sampled approximately 80 times per hunting cycle. Since the print data output clock frequency is corrected after each sample, the maximum hunt amplitude change per scan line is very small. There is an additional reduction to one-sixth of the very small change above. This is because the existing scan line, which takes approximately the first one-sixth of the cycle period time, is immediately recorded after the previous cycle time was measured and used to compensate the print output data, recording clock frequency for the existing line.

It is an object of the invention to provide improved optical techniques and apparatus for recording information on a recording medium by the use of laser beams or the like.

It is another object of the invention to provide improved means and methods to compensate for deviations from a cyclical type of operation in an optical apparatus capable of employing a laser beam or the like for recording information on a record medium.

It is still another object of the invention to minimize the effects of inertia or the like in a system which is intended to provide compensation for deviations from a normal cyclical period of operation in an optical scheme for recording information.

Yet another feature of the invention is to provide for correction for hysteresis synchronous motor hunting in a scan cycle in such a manner as to maintain relatively constant the ratio of laser beam modulation frequency to spinner angular velocity during sequential cyclical operations in an optical system.

To achieve the above and other objects of the invention, there is provided by way of example a method of placing lines of information on a medium responsive to a laser beam during successive cycles corresponding to these lines, said cycles being susceptible to deviations from a characteristic normal time period, said method comprising modulating the laser beam in accordance with this information and at a frequency which is modified for each cycle in accordance with the deviation of a preceding cycle period. In accordance with a preferred embodiment of the invention, the aforesaid frequency is modified for each cycle in accordance with the deviation existing in the preceding cycle.

According to a feature of one of the methods of the invention, the deviation for each cycle is determined by counting regularly occurring pulses during each such cycle. Preferably, this counting is effected by commencing with a fixed count at the beginning of each cycle and by counting down to the end of the corresponding cycle. According to another feature of the invention, the beginning of each cycle is determined by generating a start-of-line signal at the beginning of each of the aforesaid lines. Another feature of the invention involves effecting the counting digitally to obtain a digital count which is converted to an analog signal which is then employed to controllably generate a frequency which establishes the aforesaid laser beam and modulation frequency.

According to another feature of the invention, the regularly occurring pulses employed for the aforesaid counting are also used for establishing the aforenoted successive cycles so that these successive cycles are determined on the basis of the aforenoted regularly occurring pulses.

Other objects and features of the method of the invention will be found in the detailed description which follows hereinbelow. In this description will also be disclosed an apparatus which comprises a source of a laser beam, a medium adapted for being processed by this laser beam, a scanner arrangement adapted for directing the laser beam and causing the laser beam to scan the medium in sequential cycles, and a drive arrangement to drive the scanner for a cyclical scanning operation in which sequential cycles are realized. This drive arrangement, as will be seen, has a characteristic cycle time, but is subject to deviations therefrom during the sequential cycles. Thus, the invention provides a compensating arrangement to respond to these deviations in cycle time so as to correct each cycle based on measurement of the previous cycle time. These deviations in cycle time may be caused by slight variations in the motor speed, or, if more than one facet is used, by slightly different facets. As has been generally noted above, a modulating arrangement may be employed to modulate the laser beam in accordance with the information to be placed on the aforesaid medium. This compensating arrangement controls the modulating arrangement to adjust the timing with which the information is placed upon the medium. Control of the modulating arrangement, which is performed electronically, reduces to an absolute minimum the time involved in effecting compensation and correction in accordance with the invention.

According to a further feature of the invention, a memory is provided for storing the information concerning the deviation in timing. The compensation arrangement controls the release of this information from the memory to the modulating arrangement. According to another feature, the circuitry of the apparatus disclosed in detail below includes a counter to generate an error count during each of the sequential cycles, the resulting error counts being proportional to the deviations. Preferably, the counter is a count-down counter which commences with a fixed count and counts down for the duration of each cycle. A cycle is the interval from one start-of-line signal to the next start-of-line signal.

In accordance with still another feature of the invention, a converter arrangement is provided to convert the aforesaid error counts into voltages that are proportional to the deviation. These voltages are used to control a voltage-controlled oscillator (VCXO) and generate a corrected clock signal having a frequency responsive to the voltages that are indicative of the deviations. The voltage controlled oscillator generates a clock signal releasing the information from the above-noted memory, this information being released to the modulating arrangement. Preferably a divider is provided between the oscillator and the memory to reduce the frequency of the clock signal.

As has been noted hereinabove, the drive of the invention may preferably be a synchronous motor drive. The scanner which has been noted above may preferably be a rotatable spinner including optics to direct the laser beam. In one embodiment, the spinner is a single-facet spinner having the capability of scanning the medium for approximately one sixth of each 360° rotation.

The invention may also include a mirror assembly located between the source of the laser beam and the spinner to direct the laser beam onto the spinner, the apparatus of the invention further including a neutral density filter in the path of the laser beam and a field flattening lens between the spinner and the recording medium.

Another feature of the invention involves the utilization of a start-of-line sensor to generate a start-of-line signal for each of the sequential cycles. The resulting start-of-line signals are applied to the counter to commence the count. The count is initiated by a start-of-line signal and is terminated by the next start-of-line signal. There is an advantage in using only a start-of-line sensor rather than multiple sensors such as start-of-line and end-of-line sensors. Besides the obvious economy in using only one sensor, it is difficult to align these sensors in the manufacturing process. The mechanical stability of the finished product and its shipping container become very critical because lack of mechanical rigidity can cause multiple sensors to become mis-aligned. Moreover, in systems that use multiple facets, if multiple sensors are used for each facet, the system is even more difficult to maintain in alignment. Also employed in accordance with a feature of the invention is a latch for temporarily storing a predetermined number of least significant digits of each count during each of the aforesaid cycles.

Another feature of the invention involves the use of a reference clock to pre-set the aforesaid counter and to control the drive according to a common frequency basis. The modified frequency from the VCXO for one scan line is capable of adjusting the next scan line within the specified system error limits if and only if the variation in the amplitude and hunting frequency of the motor speed in one revolution are not too large. If these variations are too large within one revolution, then the stored correction will not be able to compensate without exceeding the specified system error. To cause the combination of the variations in the amplitude of the motor speed and the hunting frequency of the motor speed to be sufficiently small (so that a correction in the next revolution is possible within the specified system error limits), an auxiliary inertial weight is used. The amount of inertial weight added may be varied so as to adjust for differences in the required operating characteristics of the motor and its mechanical load.

The above and other objects, features and advantages of the invention will be found in the detailed description which follows hereinbelow as illustrated in the accompanying drawing.

DETAILED DESCRIPTION

Figure 1:
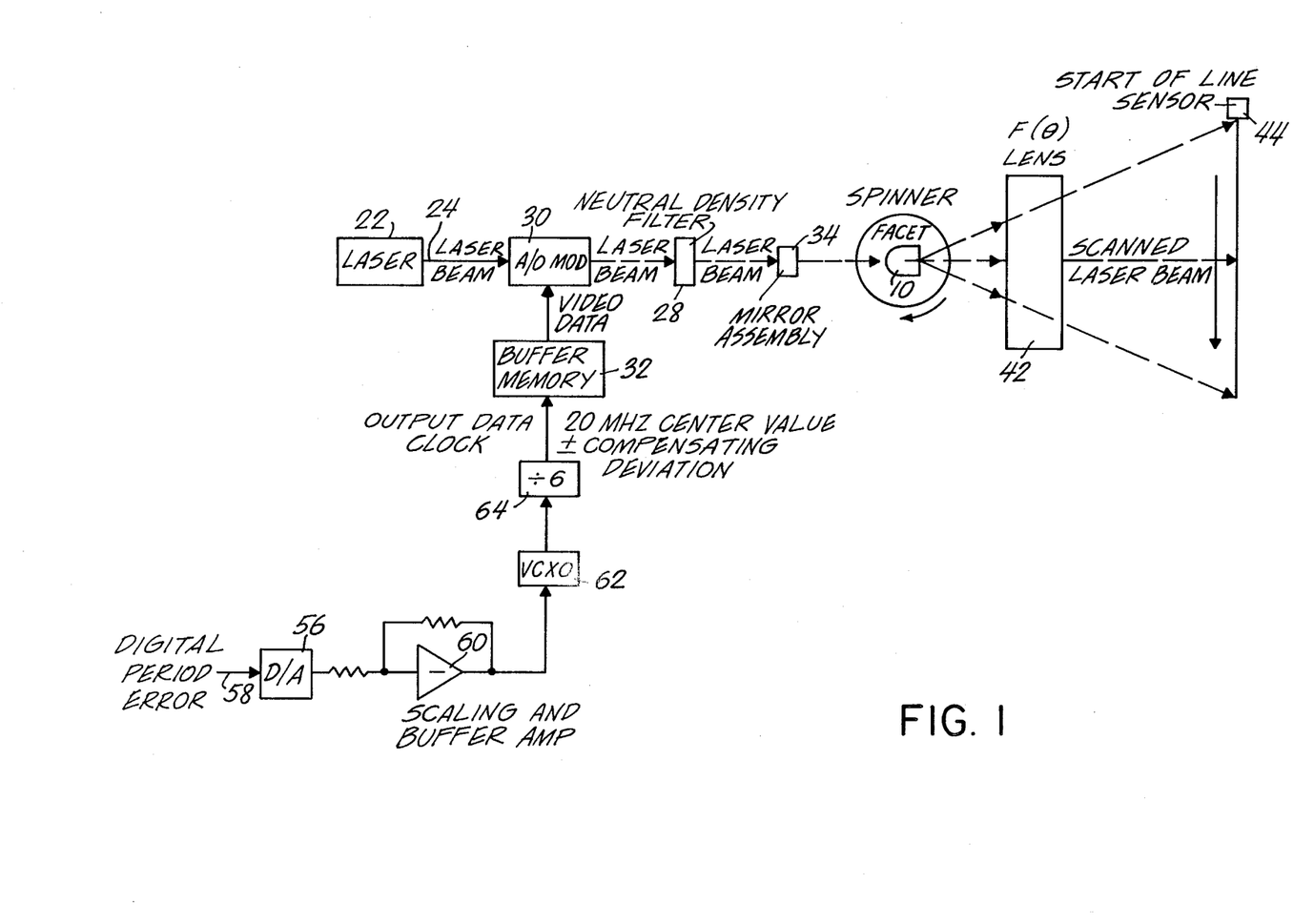
FIG. 1 is a partly block circuit diagram and partly schematic mechanical diagram of an optical system and circuit providing for the scanning of a medium by a laser beam in accordance with the invention.
Figure 2:
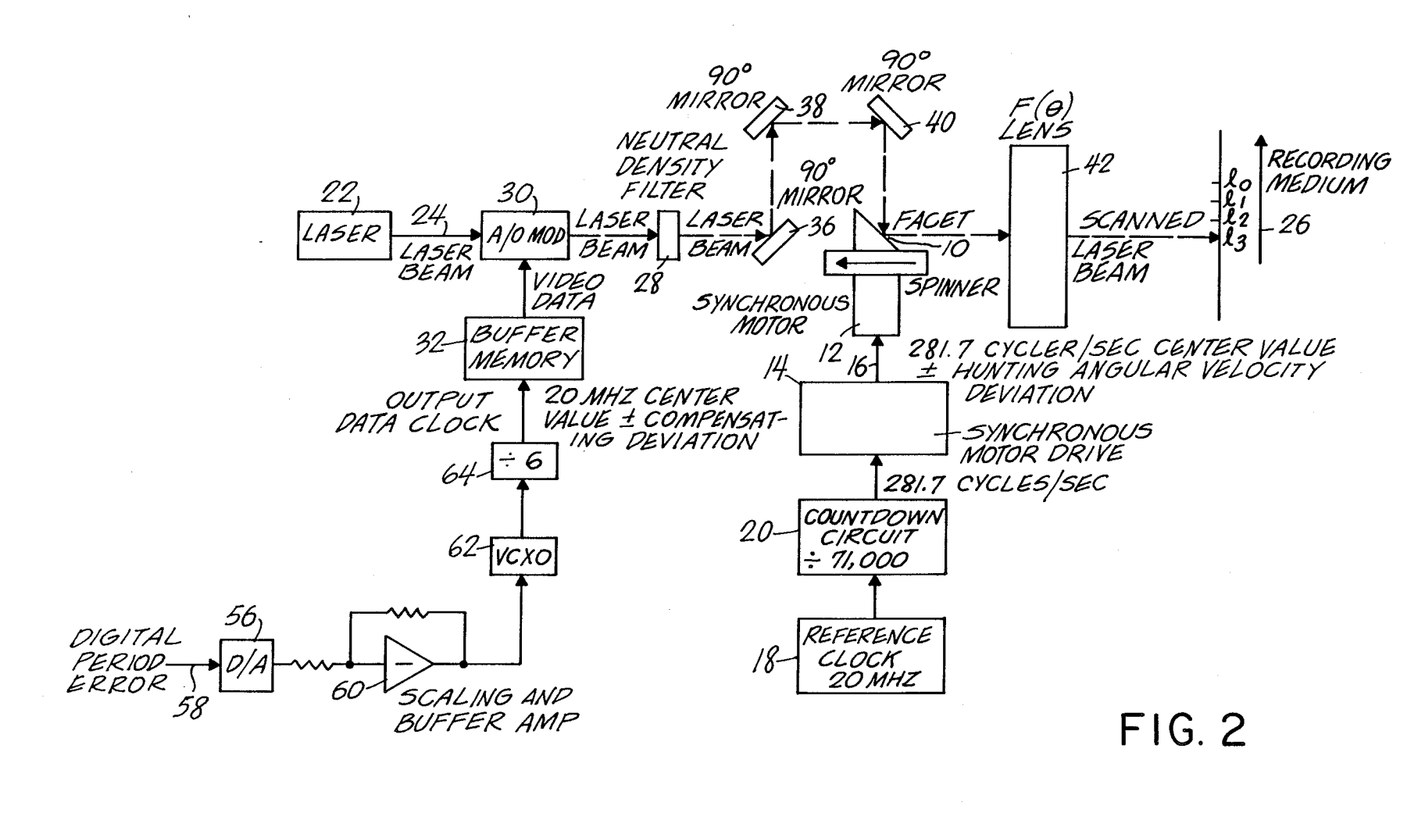
FIG. 2 is a view corresponding to FIG. 1 further including a drive for a spinner arrangement included in FIG. 1 and showing a slightly different aspect of the scanning of the recording medium.
Figure 3:
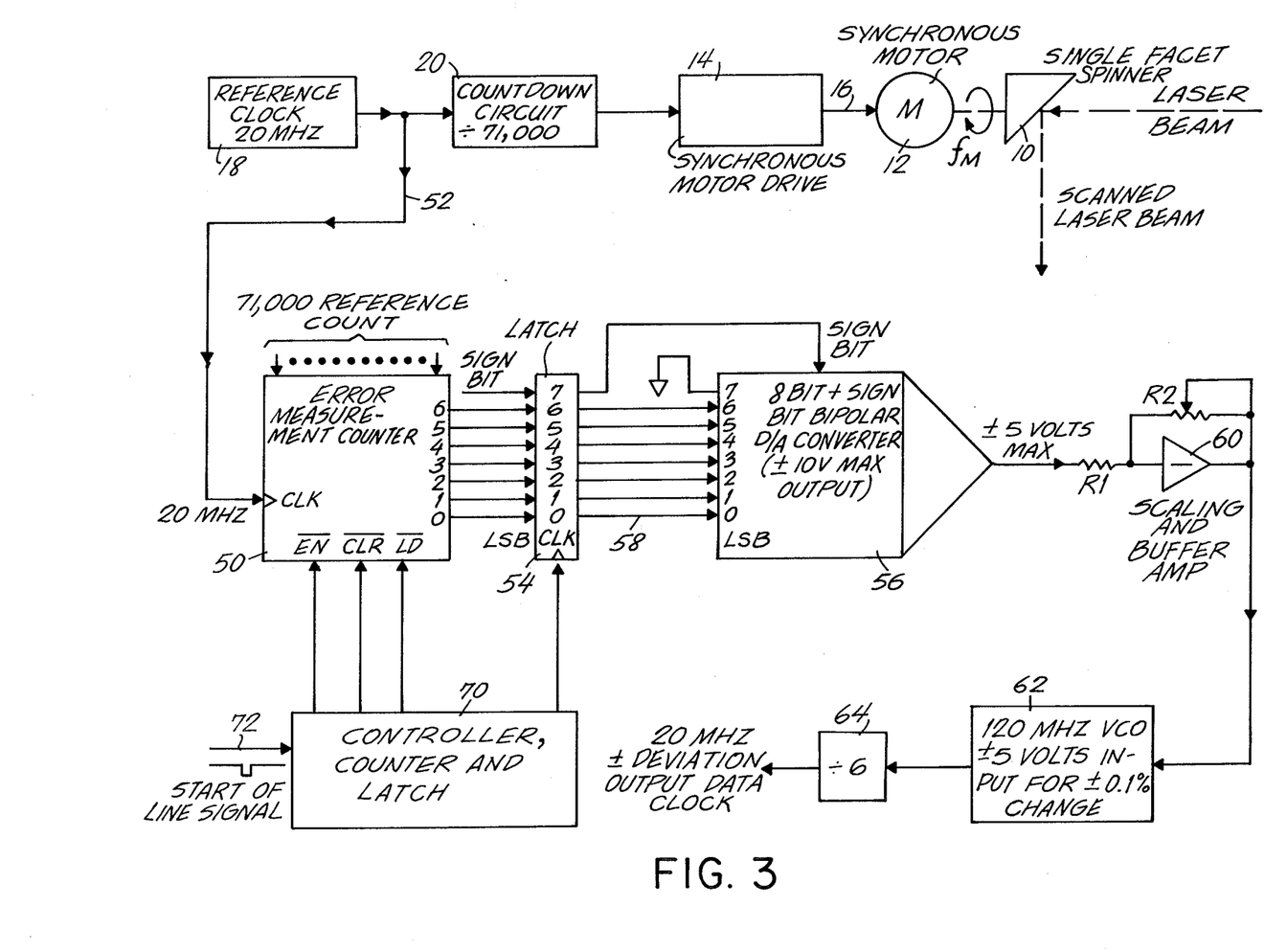
FIG. 3 is a partly block and partly schematic circuit diagram of a detail of the circuitry in FIGS. 1 and 2.

The laser printer assembly of the invention consists of the following (see FIGS. 1-3):

1. A single facet spinner 10 directly driven by a hysteresis synchronous motor 12. The use of a single facet eliminates the need for facet-to-facet error correction techniques required in multi-facet spinners although the invention can be used as well with multi-facet spinners.

2. A synchronous motor drive 14 (a power amplifier). This is connected by line 16 to motor 12 and provides the output power required to accelerate the synchronous motor to synchronous angular velocity and to maintain motor synchronism with minimum hunting angular velocity changes.

3. A 20 MHZ precise, stable fixed reference clock 18. This clock establishes the basic system timing for the synchronous motor angular velocity, the period error measurement counter and the print start of line delay from the start-of-line signal.

4. A divide-by-71,000 count-down circuit 20 which couples clock 18 to drive 14 and divides the 20 MHZ reference clock down to the synchronous motor drive center frequency of 281.7 revolutions per second. By definition, there are 71,000 pixels per revolution. Therefore, each cycle of the 20 MHZ reference clock is equal to one pixel. A pixel is herein defined as one dot (with 0.001 inches diameter) per one thousandth of an inch.

5. A low power helium neon laser 22. The laser power in the laser beam 24, which is focused and concentrated into a 0.001 inch diameter dot at the recording medium surface, is greater than required to expose the recording medium 26 at the line scanning velocity.

6. A neutral density optical filter 28. This is formed in a continuous ring on a glass disc between the outer diameter and an inner diameter. The density varies smoothly from minimum light transmission to maximum as a function of angular rotation of the disc. The neutral density optical filter is used to adjust the laser beam dot recording power to expose the recording medium properly.

7. An acoustic type optical modulator 30. The modulator can transmit the laser beam to the spinner or deflect it to prevent recording medium exposure at a 20 MHZ data rate in response to TTL, line print, digital commands from the buffer memory 32.

8. An assembly 34 of three 45 degree mirrors 36, 38 and 40 which reflect the laser beam 24 through three 90 degree angles. The laser beam, which is initially normal to the spinner axis, is directed onto the single facet parallel to the spinner axis. Since the reflecting face of the facet is 45 degrees with respect to the spinner axis, the laser beam is reflected through an additional 90 degree angle. This scans the laser beam normal to the spinner axis across the print line on the recording medium.

9. An F($\theta$) field flattening lens 42. This lens focuses the laser beam through a scan angle of approximately $-30$ degrees to $+30$ degrees, so that all points on the focal plane of the scan line (the plane of the recording medium) are in equal focus.

10. A start-of-line sensor 44. This sensor is a very fast electro-optical detector which develops an output signal pulse when the laser beam strikes its surface. This unit signals the start of a new recording line. The left margin of the copy is set by a switchable time delay from the start-of-line signal. The start-of-line signal is the cycle sensor which is used to start and stop the continuous period error measurement of each cycle.

11. The recording print medium 26. The exposure characteristic of the recording medium is fast enough to expose the recording medium with high contrast at maximum laser power at the print line scanning linear velocity.

12. An error measurement counter 50. The error measurement counter is clocked by the 20 MHZ reference clock 18 to which it is connected by line 52. The counter is loaded with the reference count of 71,000 pulses (or pixels). Since there are 71,000 pixels per spinner revolution, the counter counts down from the 71,000 pixel reference count to zero if the synchronous motor does not hunt or, in other words, is at its exact synchronous angular velocity. Since the synchronous motor will, however, ordinarily hunt, the number of error counts above or below zero (at the end of count down during a spinner revolution) represents the period timing error in digital form. The period timing error is inversely proportional to the spinner angular velocity error. The error measurement counter is cleared, loaded and enabled once each cycle so that one period measurement is made for each cycle.

13. An error data latch 54 which is used to store the digital period timing error of the previous cycle while the counter is measuring the existing cycle's period timing error. The 7 least significant error bits plus a sign bit are stored in the error data latch 54.

14. A digital-to-analog converter 56 which is used to receive and convert the previous cycle's digital period timing error into an analog error. The error is received from latch 54 via lines 58. The maximum output of the digital-to-analog converter is $\pm 5$ volts D.C. for $\pm 127$ timing error pulses. The 7 least significant error bits plus a sign bit are applied to the digital-to-analog converter 56.

15. A scaling-and-buffer amplifier 60 which is used to scale the analog output of the digital-to-analog converter to the input of the voltage-controlled crystal oscillator (VCXO) 62. The scale factor gain of amplifier 60 is determined as follows: If the synchronous motor hunts and increases its angular velocity by 0.1%, then the output data clock frequency must be increased by 0.1% to maintain straight vertical lines (i.e. to maintain precise horizontal registration of corresponding pixels, scan to scan) in the copy. When the synchronous motor angular velocity increases by 0.1%, its period time is reduced by 0.1%. This period time reduction is equal to 71 error counts. 71 error counts divided by 127 error counts per 5 volts D.C. output yields 2.795 volts D.C. Since the voltage controlled oscillator 62 requires 5 volts D.C. input for a 0.1% change, the gain of the scaling and buffer amplitude 60 must be 5 volts D.C. output divided by 2.795 volts input or 1.789 volts output per volt input.

16. The voltage controlled oscillator (VCXO) 62 which is provided with an output center frequency of 120 MHZ at 0 volts D.C. input and linear output deviations of $\pm 0.1\%$ at $\pm 5$ volts D.C. input.

17. A divide-by-6 count down circuit 64 which is used to divide down the output of the voltage controlled oscillator 62 to 20 MHZ center frequency with $\pm 0.1\%$ deviations.

18. A buffer memory 32 which is used to receive and store the one line print data from an external data source during the non-print time of each cycle (i.e., when the facet has completed a line scan and is completing a revolution) which has approximately 5/6 of a revolution. During the print time, the data stored in the buffer memory 32 is clocked out by the divided down output frequency of the voltage controlled oscillator (the output data clock, which varies directly with synchronous motor angular velocity).

The hysteresis synchronous motor 12 characteristically hunts slowly about its center-value synchronous angular velocity. The hunt amplitude is, for example, $\pm 10$ pixels at about 3.5 cycles per second hunt frequency.

The print data is scanned onto the recording medium at a rate of approximately 281.7 scans per second, approximately 80 times the synchronous motor hunting frequency. Therefore, it requires 80 print data lines for one complete hunting cycle. The maximum amplitude change from one print data line to the next line is $\pm 0.8$ pixels for sinusoidal hunting.

Each print data line is clocked out of the print data one line memory 32 by the output data clock and scanned across the recording medium during the first 60 degrees approximately, of each scan cycle or complete revolution, after the start-of-line signal is received. The print data starts after a small fixed delay for the left margin. The margin delay can be adjusted by digital switches in a dual-in-line package on the control circuit board.

The print data is initially perfect immediately after the start-of-line signal is received by controller, counter and latch circuit 70 via line 72 from start-of-line sensor 44. However, the small, synchronous motor hunting, amplitude variations will show up in the region of the copy near the right margin if they are uncorrected.

This system corrects the print data by compensating for the synchronous motor hunting with a variable output data clock frequency which is maintained directly proportional to the angular velocity of the synchronous motor. This places each print data pixel into its precisely correct position on the print data line by adjusting the frequency to a frequency which is always directly proportional to the angular velocity of the synchronous motor.

The present line output print data clocking frequency is automatically adjusted by the previous cycle's measured period. One cycle is a complete revolution from one start-of-line signal to the next start-of-line signal.

The hunting amplitude of the synchronous motor changes slowly, at approximately 3.5 cycles per second, with a maximum change of $\pm 0.8$ pixels twice per sinusoidal hunting cycle. Therefore, clocking the present line output print data, at a clock frequency determined by the previous cycle's measured angular velocity of the synchronous motor, results in a maximum error of ±0.13 pixels (1/6th of ±0.8 pixels).

The 1/6th factor applies because each print line is scanned during the first 60 degrees after each cycle's measurement of the angular velocity of the synchronous motor and almost instantaneous correction of the output print data clock frequency for the next data line. This maximum error occurs only twice per hunting cycle and all other hunting amplitude errors are smaller.

The operation of the compensating scanner system consists of the following steps:

(1) The period error, from the ideal center value of zero, for each revolution of the single facet scanner is measured by the error measurement counter 50. It is loaded with 71,000 counts or pixels at the start of each rotation and counts down as it is clocked by the 20 MHZ output frequency of the precise reference clock 18.

The error measurement counter 50 is started by the present start-of-line signal and stopped by the next start-of-line signal. The present line measured error data is latched (i.e. stored), the error measurement counter 50 is cleared and the count starts again immediately after the counter is loaded with the 71,000 pixel reference. An error measurement is made for each revolution of the scanner. The short, nanoseconds level, delay to latch the error data, clear the error measurement counter and reload the counter is calibrated for in each error measurement.

If there is no hunting of the synchronous motor during the measurement cycle, the error counter output error is zero. If the angular velocity of the synchronous motor is larger than its reference center value during the measurement cycle, the total number of counts or pixels is less than the ideal 71,000 counts loaded into the counter. The error output is a negative number of counts in this case.

If the synchronous motor angular velocity is smaller than its center reference value during the measurement cycle, the total number of counts or pixels is more than the ideal 71,000 counts loaded into the counter. The error output is a positive number of counts in this case.

(2) The 7 least significant bits of the period error measurement counter and a sign bit are loaded into the 8 bit latch 54 at the end of each measurement cycle (a complete rotation of the scanner from one start-of-line signal to the next start-of-line signal).

(3) The output of the latch is connected to a fast digital-to-analog converter 56. It converts the 8 bit digital error (7 bits magnitude and 1 bit sign) to a analog error, magnitude and polarity.

(4) The analog output of the digital-to-analog converter is amplified by a fast operational amplifier 60. This buffers the output of the digital-to-analog converter 56 and scales the output signal up as required by the frequency deviation input of the voltage controlled crystal oscillator 62.

(5) The analog output of the operational amplifier 60 is applied to the frequency deviation control input of the voltage controlled oscillator 62. The response time of the voltage controlled oscillator 62 is very short such as, for example, of the microseconds level.

The frequency output of the oscillator 62 is precisely 120 MHZ with zero volts deviation input. An analog voltage input, which represents an increase of synchronous motor angular velocity during the previous cycle, increases the frequency output of the VCXO proportionally. An analog voltage input, which represents a decrease of synchronous motor angular velocity during the previous cycle, decreases the frequency output of the VCXO proportionally.

The VCXO output frequency is divided down by a factor of 6 in divide by 6 circuit 64 to obtain the output print data clock. This clocks the print data out of the one line print data buffer memory.

For no motor hunting during the previous cycle, the output print data clock is precisely 20 MHZ. With increased synchronous motor angular velocity during the previous cycle, the divided down VCXO output frequency is 20 MHZ plus the VCXO output frequency deviation divided by 6. With decreased synchronous motor angular velocity during the previous cycle, the divide down VCXO output frequency is 20 MHZ minus the VCXO output frequency deviation divided by 6.

Therefore, the print output data clocking frequency for the present or existing cycle is locked to the period error measurement of the previous cycle. This compensates for synchronous motor angular variations caused by hunting.

Each print data pixel, from the first pixel after the left margin to the last pixel before the right margin, is always placed into its correct linear position on the printed line. This is accomplished by adjusting the frequency with which the print data pixels are generated to an output print data clock frequency which is always directly proportional to the angular velocity of the synchronous motor measured during the previous cycle.

(7) During the non-print time, the next print line data is clocked into the buffer memory 32 from the external data source.

(8) The recording medium transport assembly moves the recording medium vertically at a constant rate of 1 pixel per scan cycle.

(9) The eight steps above are continuously repeated for each and every line of the printed copy. This results in corresponding pixels in successive laser scan cycles that are precisely registered with respect to one another and with respect to the start-of-line signal (or the left margin) with no signs of synchronous motor hunting.

Derivation of Motor Synchronous Angular Velocity and Period

---

(1) By definition:

$$FREF\ CLK = 20(10^6) \frac{PULSES}{SEC}$$

FREF CLK: precise reference frequency from crystal oscillator 18.

(2) By definition:
1 revolution (OF SCANNER 10) = 71,000 PIXELS

NOTE: Single facet scanner direct driven by synchronous motor (3) Let K1 = 71,000 PIXELS/REVOLUTION (4) By definition:
1 reference clock pulse = 1 pixel (5) Therefore:

$$FMC = \frac{FREF\ CLK}{K1}$$

$$FMC = \frac{FREF\ CLK}{K1} \frac{REV.}{SEC} \quad (EQ.\ 1)$$

FMC: SYNCHRONOUS IDEAL (CENTER VALUE)

ANGULAR VELOCITY OF SYNCHRONOUS MOTOR $$FMC = \frac{20(10^6)}{7.1(10^4)}$$

$$FMC = 281.7 \frac{\text{REVOLUTIONS}}{\text{REV}}$$

$$TMC = \frac{1}{FMC} \text{ SEC} \quad (EQ. 2)$$

TMC: PERIOD (IDEAL, CENTER VALUE) OF SYNCHRONOUS MOTOR, SECONDS.

Proof that error counter output error counts are equal to pixels error (1) The actual angular velocity FM, of the synchronous motor varies about its ideal center value, FMC, because of hunting. The actual motor period, TM, varies inversely with FM, actual motor angular velocity.

(2) If the actual motor angular velocity FM, increases about its ideal center value, FMC, the actual period, TMF, decreases.

$$TMF = TMC - \Delta TMF \quad (EQ. 3)$$

TMF: CHANGE, DECREASE, FROM IDEAL (CENTER VALUE) PERIOD (3) Substituting EQ. 1 and EQ. 2 into EQ. 3

$$TMF = \frac{K1}{FREF\ CLK} - \Delta TMF \quad (EQ. 4)$$

(4) Defining $$\Delta TMF = \frac{\Delta K1F}{FREF\ CLK} \quad (EQ. 5)$$

ΔK1F: ERROR COUNTER OUTPUT ERROR COUNT, NUMBER OF ERROR PIXELS PER REVOLUTION (PULSES PER REVOLUTION) LESS THAN K1 (71,000 PULSES PER REVOLUTION).

(5) Substituting EQ. 5 into EQ. 4

$$TMF = \frac{K1}{FREF\ CLK} - \frac{\Delta K1F}{FREF\ CLK} \quad (EQ. 6)$$

(6) Rearranging EQ. 6

$$\Delta K1F = K1 - TMF\ (FREF\ CLK) \quad (EQ. 6)$$

(7) For this case of synchronous motor angular velocity above the ideal (center value), Equation 6 shows that the error counter output error count, ΔK1F pixels per revolution, is equal to K1 (71,000 pixels per revolution), which is loaded into the error counter before the count down starts, minus the actual total number of counts TMF (FREF CLK) for this revolution (with TMF, actual period, less than TMC, center value period). The error counter output is equal to the number of error pixels per revolution.

(8) If the actual motor angular velocity, FM, decreases below its ideal center value, FMC; the actual period, TMS, increases.

$$TMS = TMC + \Delta TMS \quad (EQ. 7)$$

ΔTMS: CHANGE, INCREASE, FROM IDEAL (CENTER VALUE) PERIOD (9) Substituting EQ. 1 and EQ. 2 into EQ. 7

$$TMS = \frac{K1}{FREF\ CLK} + \Delta TMS \quad (EQ. 8)$$

(10) Defining $$TMS = \frac{\Delta K1S}{FREF\ CLK} \quad (EQ. 9)$$

ΔK1S: ERROR COUNTER OUTPUT ERROR COUNT, NUMBER OF ERROR PIXELS PER REVOLUTION (PULSES PER REVOLUTION) MORE THAN K1 (71,000 PULSES PER REVOLUTION)

(11) Substituting EQ. 9 into EQ. 8

$$TMS = \frac{K1}{FREF\ CLK} + \frac{\Delta K1S}{FREF\ CLK} \quad (EQ. 10)$$

(12) Rearranging EQ. 10

$$\Delta K1S = TMS\ (FREF\ CLK) - K1 \quad (EQ. 10)$$

For this case of synchronous motor angular velocity below the ideal (center value), equation (10) shows that the error counter output error count, ΔK1S pixels per revolution, is equal to the actual total number of counts TMS(FREF CLK) for this rotation (with TMS, actual period, greater than TMC, center value period) minus K1 (71,000 pixels per rotation), which is loaded into the error counter before the count down starts.

Gain Of System At Maximum Dynamic Range (1) Assume Motor Angular Velocity Varies By ±0.1% and −0.1% Maximum Because Of Synchronous Motor Hunting & Determine Output Data Clock Variations $$FMC = \frac{FREF\ CLK}{K1} \quad (EQ. 1)$$

$$FMC = \frac{20(10^6)}{71(10^3)} = 281.690148 \frac{REV.}{SEC} $$

$$FMC = 281.6901408 \frac{REV.}{SEC}$$

$$FM\ MAX = (1.001)\ FMC \quad (EQ. 11)$$

$$FM\ MAX = 281.971831 \frac{REV.}{SEC}$$

$$FM\ MIN = (0.999)\ FMC \quad (EQ. 12)$$

$$FM\ MAX = 281.4084507 \frac{REV.}{SEC}$$

$$FCLK\ DATA\ OUTPUT = K1FM \quad (EQ. 13)$$

Rearranging EQ. 13

$$FM = \frac{FCLK\ DATA\ OUTPUT}{K1} \quad (EQ. 13)$$

Dividing EQ. 13 BY EQ. 1

$$\frac{FM}{FMC} = \frac{FCLK\ DATA\ OUTPUT}{FCLK\ REF} \quad (EQ. 14)$$

REARRANGING EQ. 14

$$FCLK\ DATA\ OUTPUT = \frac{FM\ FCLK\ REF}{FMC} \quad (EQ. 14)$$

FOR FM MAX = 281.971831 REV./SEC

FCLK DATA OUTPUT = MAX $$\frac{281.971831 \text{ (REV.) (SEC) } 20(10^6) \text{ PULSES}}{281.6901408 \text{ (SEC) (REV.) SEC}}$$

FCLK DATA OUTPUT MAX = $20.02(10^6) = 20,020,000 \frac{\text{PULSES}}{\text{(SEC)}}$ $\Delta$FCLK DATA OUTPUT MAX = (EQ. 15)

$\Delta$FCLK DATA OUTPUT MAX = FCLK DATA OUTPUT MAX − FCLK DATA OUTPUT NOM(CENTER VALUE)

$\Delta$FCLK DATA OUTPUT MAX =

$20.02(10^6) - 20.00(10^6) = +20,000 \frac{\text{PULSES}}{\text{SEC}}$

FOR FM MIN = $281.4084507 \frac{\text{REV.}}{\text{SEC}}$

FCLK DATA OUTPUT MIN = $\frac{281.4084507}{281.6901408} 20.02(10^6) \frac{\text{PULSES}}{\text{(SEC)}}$

FCLK DATA OUTPUT MIN =

$19.98(10^6) \frac{\text{PULSES}}{\text{(SEC)}} = 19,980,000 \frac{\text{PULSES}}{\text{(SEC)}}$ $\Delta$FCLK DATA OUTPUT MIN = (EQ. 16)

$\Delta$FCLK DATA OUTPUT MIN = FCLK DATA OUTPUT MIN − FCLK DATA OUTPUT NOM(CENTER VALUE)

$\Delta$FCLK DATA OUTPUT MIN =

$19.98(10^6) - 20.00(10^6) = +20,000 \frac{\text{PULSES}}{\text{SEC}}$

TABLE 1

| FM MOTOR ANGULAR VELOCITY | $\Delta$FCLK DATA OUTPUT $\Delta$VCO OUTPUT / 6 |
|---|---|
| CENTER VALUE 281.6901408 $\frac{\text{REV.}}{\text{SEC}}$ | $0 \frac{\text{PULSES}}{\text{SEC}}$ |
| MAX. VALUE (0.1% HIGH) 281.971831 $\frac{\text{REV.}}{\text{SEC}}$ | $+20,000 \frac{\text{PULSES}}{\text{SEC}}$ |
| MIN. VALUE (0.% LOW) 281.4084507 $\frac{\text{REV.}}{\text{SEC}}$ | $-20,000 \frac{\text{PULSES}}{\text{SEC}}$ |

(2) Period Timing Errors At Max. and Min. Motor Angular Velocities $TC = \frac{1}{FMC}$ (EQ. 17)

$TC = \frac{1}{281.6901408} \text{ SEC} = 3.5500000(10^{-3}) \text{ SEC}$ $T \text{ MIN} = \frac{1}{FM \text{ MAX}}$ (EQ. 18)

$T \text{ MIN} = \frac{1}{281.971831} = 3.5464535(10^{-3}) \text{ SEC}$ $T \text{ MAX} = \frac{1}{FM \text{ MIN}}$ (EQ. 19)

$T \text{ MIN} = \frac{1}{281.4084507} = 3.5535536(10^{-3}) \text{ SEC}$ $\Delta T \text{ MIN} = +T \text{ MIN} - TC$ (EQ. 20)

$\Delta T \text{ MIN} =$ $+3.5464535(10^{-3}) - 3.5500000(10^{-3}) = -0.0035465(10^{-3}) \text{ SEC}$ $\Delta T \text{ MIN} = +3.5465(10^{-6}) \text{ SEC}$ $\Delta T \text{ MAX} = T \text{ MAX} - TC$ (EQ. 21)

$\Delta T \text{ MAX} =$ $3.55535536(10^{-3}) - 3.55(10^{-3}) = +0.0035536(10^{-3}) \text{ SEC}$ $\Delta T \text{ MAX} = - +3.5536(10^{-6}) \text{ SEC}$ $\Delta$ERROR PULSES COUNTER = $\Delta T$ (FCLK REF) (EQ. 22)

$\Delta$ERROR PULSES COUNTER MIN. = $\Delta T$ MIN (FCLK REF) (EQ. 23)

$\Delta$ERROR PULSES COUNTER MIN = $(-3.5465)(20) = -70.93$ ERROR PULSES $\Delta$ERROR PULSES, COUNTER MIN = 70 ERROR PULSES,

PARTS OF A PULSE CANNOT OCCUR $\Delta$ERROR PULSES COUNTER MAX = $\Delta T$ MAX (FCLK REF) (EQ. 24)

TABLE 2
SYSTEM RANGE

| FM MOTOR ANGULAR VELOCITY | $\Delta$FCLK DATA $\Delta$VCO OUTPUT / 6 | $\Delta$ERROR PULSES (PIXELS) COUNTER |
|---|---|---|
| $\frac{\text{REV}}{\text{SEC}}$ | $\frac{\text{PULSES}}{\text{SEC}}$ | PULSES |
| 281.6901408 CENTER VALUE | 0 | 0 |
| 281.971831 MAX. VALUE | +20,000 | −70 |
| 281.4084507 MIN. VALUE | −20,000 | +71 |

(3) Gain Of System At Maximum Dynamic Range

SYSTEM GAIN = (EQ. 25)

$$\frac{20,000 \text{ PULSES/SEC}}{\frac{\Delta \text{ERROR PULSES COUNTER MAX} + \Delta \text{ERROR PULSES COUNTER MIN}}{2 \text{ CYCLES}}}$$

SYSTEM GAIN =

$$\frac{20,000}{\frac{71.07 + 70.93}{2}} = \frac{20,000}{71} = \frac{281.7}{1} \frac{\text{REV}}{\text{SEC}}$$

-continued

SYSTEM GAIN = $\frac{281.7}{1} \frac{REV.}{SEC}$

NOTE: GAIN CHECKS ORIGINAL SYSTEM DESIGN GAIN

FMC = SYSTEM DESIGN GAIN = $\frac{FCLK\ REF}{K1}$ (EQ. 1)

FMC = SYSTEM DESIGN GAIN = $\frac{20(10^6)}{71(10^3)}$

FMC = SYSTEM DESIGN GAIN = $281.69014 \frac{REV.}{SEC}$ (4) Operational Amplifier Gain VOUT DAC = $\frac{71\ PULSES\ (5\ VOLTS)}{127\ PULSES\ MAX}$ = 2.7953 VOLTS

VINPUT VCO = 5 VOLTS (FOR ±0.1% DEVIATIONS)

GAIN OF AMP = $\frac{VINPUT\ VCO}{VOUTPUT\ DAC} = \frac{5.0000}{2.7953}$ = 1.789

GAIN OF AMP = 1.789 $\frac{VOLTS\ OUTPUT}{VOLT\ INPUT}$

Resolution of System At ±1 Counter Output Error Pulse (1) Assuming Motor Angular Velocity Varies By ±1 Counter Error Pulse And −1 Counter Error Pulse & Determine Motor Angular Velocity Variations $\Delta T = \frac{\Delta ERROR\ PULSES\ COUNTER}{FCLK\ REF}$ (EQ. 22)

$\Delta T = \frac{1\ (SEC)}{20(10^6)} = 50(10^{-9})$ SEC

T MAX = TC + ΔT MAX (EQ. 21)

T MAX = $3.55(10^{-3}) = 0.00005(10^{-3}) = 3.55005(10^{-3})$ SEC

T MAX = $3.55005(10^{-3})$ SEC

FM MIN = $\frac{1}{T\ MAX}$ (EQ. 19)

FM MIN = $\frac{1\ CYCLE}{3.55005(10^{-3})}$ = 281.6861734 $\frac{CYCLES}{SEC}$

FCLK DATA OUTPUT = $\frac{FM\ FCLK\ REF}{FMC}$ (EQ. 14)
MIN

FCLK DATA OUTPUT = $\frac{(281.6861734)}{(281.6901408)}$ = 
MIN $\frac{20(10^6)}{SEC}$ PULSES = 19.99971832(10^6) $\frac{PULSES}{SEC}$ FCLK DATA OUTPUT = 19,999,718.32 $\frac{PULSES}{SEC}$
MIN

ΔFCLK DATA OUTPUT = (EQ. 16)
MIN

FCLK DATA OUTPUT − FCLK DATA OUTPUT
MIN            NOM (CENTER VALUE)

ΔFCLK DATA OUTPUT =
MIN 19,999,718 − 20,000,000 = −282 $\frac{PULSES}{SEC}$

T MIN = TC + ΔT MIN (EQ. 20)

T MIN = $3.55(10^{-3}) - 0.00005(10^{-3}) = 3.54995(10^{-3})$ SEC

T MIN = $3.54995(10^{-3})$ SEC

FM MAX = $\frac{1}{T\ MIN}$ (EQ. 18)

FM MAX = $\frac{1\ CYCLE}{3.54995(10^{-3})\ SEC}$ = 281.6941084 $\frac{CYCLES}{SEC}$ FCLK DATA OUTPUT = $\frac{FM\ FCLK\ REF}{FMC}$ (EQ. 14)
MAX

FCLK DATA OUTPUT =

$\frac{(281.6941084)}{281.6901408}$ 20(10^6) $\frac{PULSES}{SEC}$ = 20.0002817(10^6) $\frac{PULSES}{SEC}$ FCLK DATA OUTPUT = 20,000,281.7 $\frac{PULSES}{SEC}$
MAX

ΔFCLK DATA OUTPUT = (EQ. 15)
MAX

FCLK DATA OUTPUT − FCLK DATA OUTPUT
MAX            NOM (CENTER VALUE)

ΔFCLK DATA OUTPUT =

20,000,281 − 20,000,000 = 281 $\frac{PULSES}{SEC}$

TABLE 3

SYSTEM RESOLUTION

| FM MOTOR ANGULAR VELOCITY - REV./SEC | ΔFCLK DATA OUTPUT ΔVCO OUTPUT 6 | ΔERROR PULSES COUNTER EACH CYCLE |
|---|---|---|
| REV./SEC | PULSES/SEC | PULSES |
| 281.6901408 CENTER VALUE | 0 | 0 |
| 281.6941084 MAX. VALUE | +281 | −1 |
| 281.6861734 MIN. VALUE | −282 | +1 |

(2) Gain Of System At Resolution of ±1ΔERROR

PULSES/CYCLE

SYSTEM GAIN = $\frac{281}{1}$ = 282 $\frac{CYCLES}{SEC}$

It is thus seen this invention corrects for hysteresis synchronous motor hunting in a present or existing scan cycle by automatically setting and locking the output print data clock frequency (laser modulation frequency) so that the ratio of the present or existing cycle output print data clock frequency to the synchronous motor angular velocity measured during the previous cycle is maintained constant at 71,000 pixels per revolution.

The invention measures the period error of each and every cycle using only one position indication per scan (the start-of-line signal as a sensor). No additional position sensors and no devices for splitting the energy from the laser beam are required.

The invention also varies the output print data clock frequency, so that the ratio of output print data clock frequency to synchronous motor angular velocity is maintained constant at 71,000 pixels per revolution by means of a voltage controlled crystal oscillator.

The invention moreover in one embodiment uses a single facet scanner, direct driven by a high speed hysteresis synchronous motor. This system will, however, work equally as well with a multi-facet scanner. There will still be one correction per scan. However, there will be multiple corrections, equal to the number of facets, per revolution. Therefore, the sample rate or ratio of corrections to hunt frequency would be multiplied by the number of facets.

The invention also provides for scanning and printing the output data during the first 60 degrees (approximately) immediately after the synchronous motor angular velocity measurement and subsequent output print data clock frequency adjustment at the end of the previous revolution. This reduces the system error by a factor of 1/6th.

The reduction factor of 1/6th comes from the fact that the system error per revolution is an output print data clock frequency error. The system error for each scan line starts at 0 pixels error, at the start-of-line, and increases linearly. The peak print error at the end of line scan (first 60 degrees approximately after the output print data frequency correction) is 1/6th of the system error per revolution.

This invention deals with a resolution of one pixel per revolution. This would ordinarily result in an uncertainty error of ±1 pixel per revolution. It is the least significant bit in the period measurement error counter, which is clocked by the 20 MHZ reference frequency. The uncertainty error of ±1 pixel per revolution is reduced to ±/6 pixel at the end of line scan. The resolution of the system can be improved as desired by increasing the reference clock frequency. For instance: at 40 MHZ reference clock frequency, the resolution will be ½ pixel per revolution at 60 MHZ reference clock frequency the resolution will be ⅓ pixel per revolution and so on.

Increasing the resolution will reduce the ±1 count uncertainty error per revolution to ±½ pixel per revolution at 40 MHZ reference clock frequency and to ±⅓ pixel per revolution at 60 MHZ.

The reduction factor of 1/6th above applies to these values so that the maximum end-of-line scan uncertainty errors become 1/12 pixel at 40 MHZ and 1/18 pixel at 60 MHZ respectively.

The circuit and method of the invention reduce the synchronous motor hunting frequency and amplitude by increasing the synchronous motor inertia to any degree desired with an auxiliary inertia weight on the motor end opposite the facet scanner. The reduction in hunting frequency occurs since $$fH = \frac{1}{2\pi} \sqrt{KLOOP/J}$$

where fH is the hunting frequency, K LOOP is the hysteresis synchronous loop gain and J is the total inertia of the synchronous motor rotor, the scanning facet assembly and the auxiliary inertia wheel. The synchronous motor amplitude response to impulsive type torque disturbances from the ball bearings will be reduced since the peak hunting angular amplitude is proportional to the hunting natural frequency.

The circuit and method of the invention will operate with synchronous motor hunt amplitudes of ±70 pixels peak at hunt frequencies up to 7.0 cycles per second. In normal stabilized operation, the synchronous motor hunt amplitudes are ±10 pixels peak at 3.5 to 4.0 cycles per second.

Immediately after reaching synchronous speed and locking into synchronism, the motor hunt amplitudes contain large overshoots which dampen out quickly to the normal operating levels of ±10 pixels. The ±70 pixels capture range of the voltage controlled crystal oscillator used in this embodiment allows compensation synchronization to occur during the settling time. This results in quality copy more quickly.

In accordance with the invention, there is used a voltage controlled crystal oscillator to track the motor hunting rather than controlling the motor hunt amplitude directly. This has the advantage of closely tracking with a very low inertia system (the voltage controlled crystal oscillator) possessing a very fast response time, rather than with the very high inertia rotating motor which has a much longer response time for corrections.

This invention further allows the ratio of the spinner motor rotational frequency to the spinner motor hunt frequency to be increased by increasing motor inertial. This ratio determines the number of samples per motor hunt cycle and therefore increasing this ratio increases the accuracy of the scan correction circuit.

What is claimed is:

1. Apparatus comprising a source of a laser beam, a medium adapted for being processed by said laser beam, scanner means adapted for directing said laser beam and causing said laser beam to scan said medium in sequential scan lines, drive means to drive said scanner means to produce said sequential scan lines, said drive means having a rotational speed subject to deviations, compensating means to respond to said deviations to correct subsequent sequential scan lines, modulating means to modulate said laser beam in accordance with pixel information to be placed upon said medium, said compensating means controlling said modulating means to control the rate with which the pixel information is placed upon said medium to compensate for the deviations of the drive means so that the rate at which the pixels are generated for each scan line is corrected relative to the rate at which the pixels were generated in the previous scan line, memory means for storing said information, said compensating means controlling the release of said information from the memory means to the modulating means, counting means to generate an error count during each of said sequential scan lines, the resulting error counts being proportional to said deviations, and a start-of-line sensor means to generate a start-of-line signal for each of said sequential scan lines and to apply the resulting start-of-line signals to the counting means to commence and terminate the count for each of said scan lines.

2. Apparatus as claimed in claim 1 wherein the counting means is a count-down means which commences with a fixed count and counts down for the duration of each cycle.

3. Apparatus as claimed in claim 1 comprising converter means to convert the error counts into proportional voltages, and a voltage controlled oscillator means responsive to said proportional voltages to generate a variable clock signal having a frequency responsive to said voltages, said variable clock signal releasing the information from the memory means to the modulating means.

4. Apparatus as claimed in claim 3 comprising a dividing means between the voltage controlled oscillator means and memory means to reduce the frequency of the variable clock signal.

5. Apparatus as claimed in claim 1 wherein the drive means is a synchronous motor, including auxiliary inertia weight means on said motor to reduce frequency of said deviations.

6. Apparatus as claimed in claim 1 wherein the scanner means is a rotatable spinner including optics to direct said laser beam.

7. Apparatus as claimed in claim 6 wherein said spinner is a single-facet spinner having the capability of scanning the said medium for a fraction of each 360° rotation.

8. Apparatus as claimed in claim 7 comprising a mirror assembly located between the source of the laser beam and the spinner to direct the laser beam onto the spinner, said apparatus further including a neutral density filter in the path of the laser beam and a field flattening lens means between said spinner and the medium.

9. Apparatus as claimed in claim 1 comprising latch means for temporarily storing a predetermined number of least significant digits of each error count during each of said cycles.

10. Apparatus as claimed in claim 1 comprising a reference clock means to control both said counting means and said drive means according to a common precise constant reference clock signal.

* * * * *